(12) United States Patent
El-Onsi et al.

(10) Patent No.: US 11,611,516 B2
(45) Date of Patent: Mar. 21, 2023

(54) SYSTEMS AND METHODS FOR RESOURCE ALLOCATION

(71) Applicant: The Toronto-Dominion Bank, Toronto (CA)

(72) Inventors: Kareem El-Onsi, Toronto (CA); Garima Aggarwal, Toronto (CA); Raymond Alan Young, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 262 days.

(21) Appl. No.: 16/506,148

(22) Filed: Jul. 9, 2019

(65) Prior Publication Data

US 2021/0014173 A1 Jan. 14, 2021

(51) Int. Cl.
*H04L 47/78* (2022.01)
*H04L 47/10* (2022.01)
*H04L 47/80* (2022.01)
*H04L 47/70* (2022.01)

(52) U.S. Cl.
CPC ............ *H04L 47/781* (2013.01); *H04L 47/29* (2013.01); *H04L 47/808* (2013.01); *H04L 47/822* (2013.01)

(58) Field of Classification Search
CPC ..... H04L 47/781; H04L 47/808; H04L 47/29; H04L 47/822
See application file for complete search history.

(56) References Cited

U.S. PATENT DOCUMENTS

| | | | |
|---|---|---|---|
| 8,306,885 B2 | 11/2012 | Brose et al. | |
| 8,639,622 B1 | 1/2014 | Moore et al. | |
| 9,251,539 B2 | 2/2016 | Imrey et al. | |
| 2006/0190482 A1* | 8/2006 | Kishan | G06F 9/50 |
| 2006/0218068 A1 | 9/2006 | Loeper | |
| 2009/0089205 A1* | 4/2009 | Bayne | G06Q 20/1085 705/43 |
| 2009/0287834 A1* | 11/2009 | Alcorn | G06F 21/305 709/229 |
| 2011/0179015 A1* | 7/2011 | Balebail | G06F 16/2445 707/720 |
| 2014/0114735 A1 | 4/2014 | Isaacson et al. | |

(Continued)

FOREIGN PATENT DOCUMENTS

| | | |
|---|---|---|
| WO | 2010123706 | 10/2010 |
| WO | 2013074876 | 5/2013 |

*Primary Examiner* — Nicholas R Taylor
*Assistant Examiner* — Sanjoy K Roy
(74) *Attorney, Agent, or Firm* — Rowand LLP (57) ABSTRACT

A computer-implemented for allocating resources is disclosed. The method includes: receiving, from a client device associated with an entity, input including a selection of a first operation; obtaining a threshold quantity of resources associated with the first operation; allocating a first quantity of resources associated with the entity to the first operation; detecting a trigger condition for obtaining resources associated with the first operation; and in response to detecting the trigger condition for obtaining resources associated with the first operation: determining a second quantity of resources associated with the entity for allocation to the first operation based on a difference between the threshold quantity of resources associated with the first operation and the first quantity of resources; and transmitting, to the client device, a signal representing a message indicating the second quantity of resources.

18 Claims, 8 Drawing Sheets

(56) References Cited

U.S. PATENT DOCUMENTS

| | | | |
|---|---|---|---|
| 2014/0324675 A1* | 10/2014 | Ahlers | G06Q 20/10 |
| | | | 705/38 |
| 2017/0053353 A1 | 2/2017 | Groom | |
| 2017/0186085 A1* | 6/2017 | Nagla | G06Q 40/025 |
| 2017/0213257 A1* | 7/2017 | Murugesan | G06Q 30/0275 |
| 2017/0337279 A1* | 11/2017 | Babu | G06F 16/24569 |
| 2018/0189888 A1 | 7/2018 | Deperro et al. | |
| 2018/0254996 A1* | 9/2018 | Kairali | H04L 67/1031 |

\* cited by examiner

SYSTEMS AND METHODS FOR RESOURCE ALLOCATION

TECHNICAL FIELD

The present disclosure relates to resource management and, in particular, to systems and methods for allocating resources in a networked environment.

BACKGROUND

A computing device typically has a finite amount of computing resources, such as processing power, memory, and data storage. The computing device may additionally have access to shared resources that may be shared among a plurality of devices of a network. The totality of the resources that are available to the computing device are allocated to various operations performed on the computing device. In particular, some of the available resources may be allocated to scheduled or desired computing operations. That is, resources may be set aside for various user-selected operations that are scheduled or desired to be performed on the computing device.

A computing device may not efficiently utilize available resources or may not accurately allocate such resources among its operations. Inefficient or inaccurate allocation of resources may result in too many or too few resources being allocated to a given operation. Further, while resources are finite at any given moment, the pool of available resources for a computing device may expand or contract over time. For example, additional memory or processing capacity may be provided for a computing device. Changes to the manner by which resources are allocated may lag such changes to the pool of available resources or the operations that are to share such resources.

Thus, there is a need for improved methods and systems for allocating resources.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a computing system. The computing system includes a processor, a communications module coupled to the processor, and a memory coupled to the processor. The memory stores instructions that, when executed, configure the processor to: receive, via the communications module from a client device associated with an entity, input including a selection of a first operation; obtain a threshold quantity of resources associated with the first operation; allocate a first quantity of resources associated with the entity to the first operation; detect a trigger condition for obtaining resources associated with the first operation; and in response to detecting the trigger condition for obtaining resources associated with the first operation: determine a second quantity of resources associated with the entity for allocation to the first operation based on a difference between the threshold quantity of resources associated with the first operation and the first quantity of resources; and transmit, to the client device, a signal representing a message indicating the second quantity of resources.

In some implementations, the client device may be associated with one or more first database records of a database, and determining the first quantity of resources may comprise determining an allocation of resources of the one or more first database records to the first operation.

In some implementations, determining the second quantity of resources may comprise determining an increase in quantity of resources associated with the entity for allocation to the first operation.

In some implementations, determining the increase in quantity of resources associated with the entity for allocation to the first operation may comprise determining a quantity of resources available for borrowing by the entity, and the processor is configured to transmit a second message indicating the quantity of resources available for borrowing.

In some implementations, detecting the trigger condition may comprise determining that the quantity of resources available for borrowing is greater than a difference between the threshold quantity of resources associated with the first operation and the first quantity.

In some implementations, the entity may be associated with at least one other operation different from the first operation, and determining the increase in quantity of resources associated with the entity for allocation to the first operation may comprise determining a change in allocation of resources associated with the entity to one or more of the at least one other operation.

In some implementations, the input may also include a date parameter associated with the first operation, and detecting the trigger condition may comprise determining that a current date is within a time range defined based on the date parameter associated with the first operation.

In some implementations, detecting the trigger condition may comprise determining, based on transactions data for the entity, that at least a threshold number of transactions associated with the first operation have been completed.

In some implementations, the input may also include at least one location associated with the first operation, and wherein detecting the trigger condition comprises detecting, based on location data for the client device, that the client device is located at one of the at least one location.

In some implementations, detecting the trigger condition may comprise detecting that the threshold quantity of resources associated with the first operation has changed.

In another aspect, the present disclosure describes a method for real-time allocation of resources. The method includes: receiving, from a client device associated with an entity, input including a selection of a first operation; obtaining a threshold quantity of resources associated with the first operation; allocating a first quantity of resources associated with the entity to the first operation; detecting a trigger condition for obtaining resources associated with the first operation; and in response to detecting the trigger condition for obtaining resources associated with the first operation: determining a second quantity of resources associated with the entity for allocation to the first operation based on a difference between the threshold quantity of resources associated with the first operation and the first quantity of resources; and transmitting, to the client device, a signal representing a message indicating the second quantity of resources.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Computing systems typically have limited amount of resources, such as processing power, memory, and data storage, to allocate to their various operations. The operations associated with a computing system may vary in terms of resource need, temporal requirement, and priority. Accordingly, techniques for effectively managing the allocation of available resources of a computing system to its operations are desirable.

In some instances, resources may be set aside for various user-selected operations associated with a computing system. For example, one or more scheduled or desired operations may be defined for a client device (or other computing system), and all or part of the available resources for the client device may be allocated to said operations. Once allocated to these user-selected operations, the allocated resources may become unavailable for other operations of the client device. That is, only the resources remaining after allocation to the user-selected operations may be available for the other operations.

These user-selected operations may often be operations that are of importance to the client. For example, the user-selected operations may relate to specific objectives that are desired to be fulfilled by the client, in view of the totality of the available resources for the client. The user-selected operations may, for example, be operations that are prioritized over other operations that can be performed on the client device.

In an aspect, the present disclosure provides systems and methods for dynamically allocating resources associated with an entity to one or more user-selected operations. The resources associated with the entity are allocated based on monitoring of the user-selected operations, quantity of resources previously allocated to the user-selected operations, and trigger conditions for obtaining resources associated with the user-selected operations. User input of a selection of a first operation is received from the client device associated with the entity. In response to receiving said user input, a threshold quantity of resources associated with the first operation is obtained, and a first quantity of resources associated with the entity is allocated to the first operation. A trigger condition for obtaining resources associated with the first operation is then detected. The detected condition may be one of a plurality of trigger conditions that are defined for the first operation. In response to detecting the trigger condition, a second quantity of resources associated with the entity is determined for allocation to the first operation. The determination of the second quantity is based on a difference between the threshold quantity associated with the first operation and the first quantity of resources associated with the entity previously allocated to the first operation.

In another aspect, the present disclosure provides a computing system for allocating resources to one or more user-selected operations. For example, a server computer may monitor the available resources of an entity and allocate resources to the operations of a client device. The computing system receives input of a selection of a first operation from a client device. In response to receiving said input, the computing system obtains a threshold quantity of resources associated with the first operation, and allocates a first quantity of resources associated with the entity to the first operation. The computing system then monitors one or more defined trigger conditions for obtaining resources associated with the first operation. Upon detecting one of the trigger conditions, the computing system determines a second quantity of resources associated with the entity for allocation to the first operation. The determination of the second quantity is based on a difference between the threshold quantity associated with the first operation and the first quantity of resources associated with the entity previously allocated to the first operation.

In yet another aspect, the present disclosure provides methods for an entity to manage allocation of its resources. More specifically, methods are disclosed for managing resources of one or more user accounts associated with an entity. For example, a resource allocation application (or similar software tool) on a client device may enable a user to allocate resources of its accounts, such as banking (e.g. savings) accounts, to various operations or objectives that are defined by the user. The resource allocation application may be configured to receive user selection of one or more operations as well as other information, such as threshold quantity of resources, location, and projected completion date, associated with the operations. The resource allocation application may also be configured to receive user input of an initial allocation of the resources of the user's account(s). The resource allocation application transmits the inputted information to a resource server which monitors for one or more trigger conditions associated with the user-defined operations. Upon detecting a trigger condition associated with a particular one of the operations, the server determines a quantity of additional resources that is required for completing the operation. The resource allocation application receives an indication of this quantity of additional resources for the operation from the server and provides a user of the client device with options for obtaining the required additional resources. For example, the resource allocation application may present the user with an option to change a current allocation of the resources of the user's account(s) to the user-defined operations. As another example, the resource allocation application may present a loan or credit offer extended by the resource server for obtaining the required additional resources.

In yet another aspect, the present disclosure provides methods for generating offers to lend resources to a client device. For example, a resource server which maintains and provides access to shareable or lendable resources may implement the disclosed methods to facilitate borrowing by an entity associated with a client device. Specifically, the resource server may be configured to determine a quantity of resources that is available for borrowing by the entity. The resource server monitors for one or more defined trigger conditions for obtaining resources associated with a first operation for a client device associated with an entity. A trigger condition is detected by the resource server upon determining that the quantity of resources available for borrowing by the entity is equal to or greater than a difference between a threshold quantity of resources associated with the first operation and a first quantity of resources previously allocated to the first operation. Upon detecting this trigger condition, the resource server may be configured to generate an offer to lend resources for transmission to the client device. For example, an offer to lend a quantity of resources that is at least equal to the difference between the threshold quantity and the first quantity may be provided to the client device.

The disclosed techniques allow for dynamic allocation of resources to one or more user-selected operations based on resource need, priority, temporal requirement, and changes to available resource pool. In particular, a computing system monitors one or more trigger conditions for obtaining resources associated with a specific user-selected operation, which trigger conditions initiate a process for completing the operation. The user-selected operations are associated with a specific entity. For example, the user-selected operations may be associated with one or more accounts or database records of the entity, or a client device associated with the entity.

By monitoring for and detecting trigger conditions associated with various operations for an entity, the computing system can determine which operations should or can be completed imminently and provide real-time notification of such determination to a client device associated with the entity. For example, the entity may be enabled to evaluate priorities of its operations and dynamically allocate or re-allocate resources to the operations, upon detection by the computing system of the trigger conditions. In particular, the computing system allows for real-time re-allocation of resources and/or real-time generation of offers to lend resources, facilitating efficient allocation of the entity's resources to its various operations. For example, the disclosed methods may enable real-time re-allocation of computing resources, such as processing power and memory, associated with a client computing device to operations of that device, based on detection of pre-defined trigger conditions associated with the respective operations.

Figure 1:
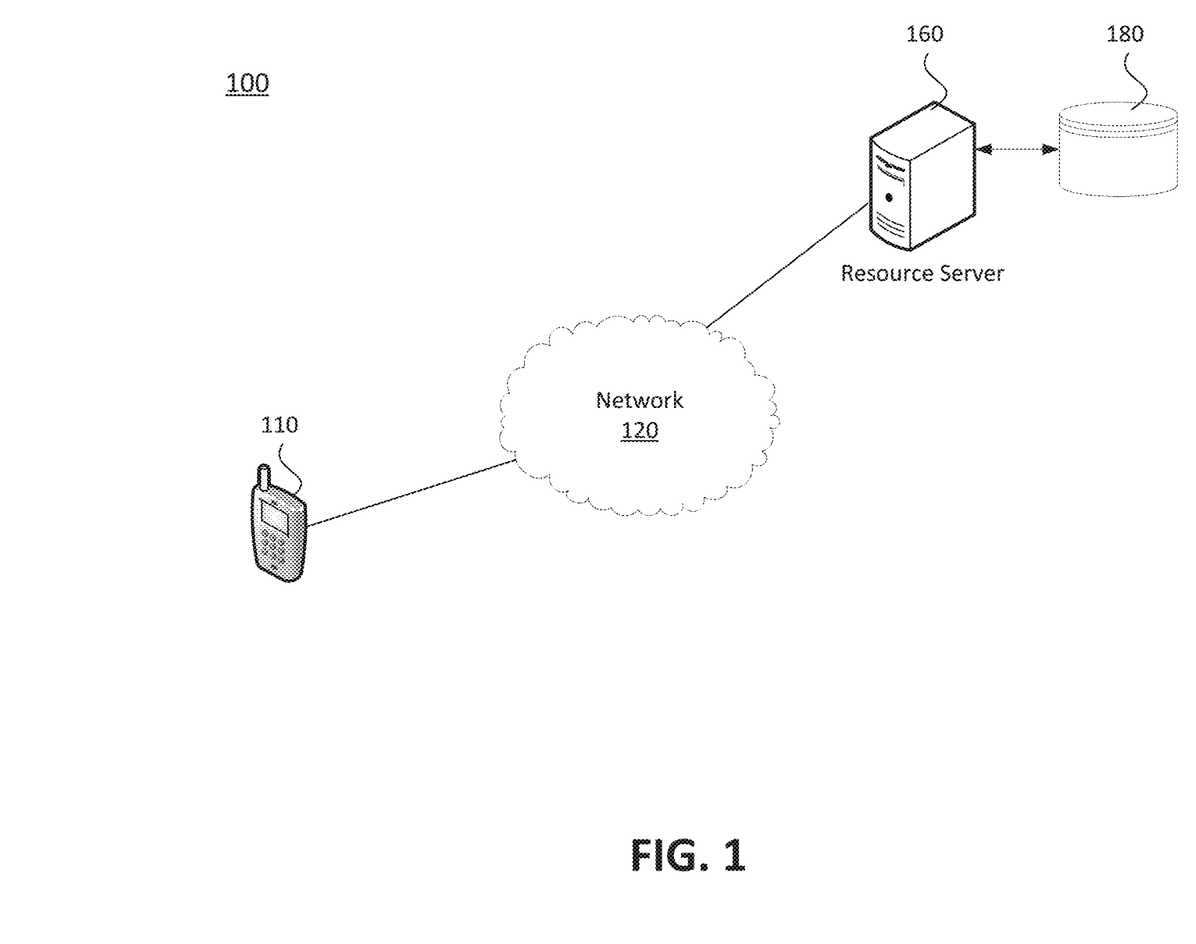
FIG. 1 is a schematic operation diagram illustrating an operating environment of an example embodiment.

FIG. 1 is a schematic diagram illustrating an operating environment of an example embodiment. In particular, FIG. 1 illustrates exemplary components of a system 100 for allocating resources to a plurality of operations associated with a client device. As a specific example, the system 100 of FIG. 1 may be implemented to facilitate, at least, selection of one or more operations associated with an entity/client device, initial allocation of resources associated with the entity to the selected operations, detecting trigger conditions for obtaining additional resources for the selected operations, and obtaining resources for performing the selected operations.

As illustrated, a resource server 160 (which may also be referred to as a server computer system) and client device 110 communicate via the network 120. The client device 110 is a computing device that is associated with an entity, such as a user or client, having resources associated with the resource server 160. For example, the resource server 160 may track, manage, maintain, and/or lend resources to the entity. The resources may, for example, be computing resources, such as memory or processor cycles. By way of further example, the resources may include stored value, such as fiat currency, which may be represented in a database. The resource server 160 may be coupled to a database 180, which may be provided in secure storage. The secure storage may be provided internally within the resource server 160 or externally. The secure storage may, for example, be provided remotely from the resource server 160. For example, the secure storage may include one or more data centers. The data centers may, for example, store data with bank-grade security.

The database 180 may include records for a plurality of accounts and at least some of the records may define a quantity of resources associated with an entity. For example, the entity that is associated with the client device 110 may be associated with an account having one or more records in the database. The records may reflect a quantity of stored resources that are associated with the entity. Such resources may include owned resources and, in at least some embodiments, borrowed resources (e.g. resources available on credit). The quantity of resources that are available to or associated with an entity may be reflected by a balance defined in an associated record such as, for example, a bank balance.

The resource server 160 may, for example, be a financial institution server and the entity may be a customer of a financial institution operating the financial institution server.

The client device 110 may be used, for example, to configure a data transfer from an account associated with the client device 110. More particularly, the client device 110 may be used to configure a data transfer from an account associated with an entity operating the client device 110. The data transfer may involve a transfer of data between a record in the database 180 associated with such an account and another record in the database 180 (or in another database such as a database associated with another server (not shown) which may be provided by another financial institution, for example, and which may be coupled to the resource server 160 via a network). The other record is associated with a data transfer recipient such as, for example, a bill payment recipient. The data involved in the transfer may, for example, be units of value and the records involved in the data transfer may be adjusted in related or corresponding manners. For example, during a data transfer, a record associated with the data transfer recipient may be adjusted to reflect an increase in value due to the transfer whereas the record associated with the entity initiating the data transfer may be adjusted to reflect a decrease in value which is at least as large as the increase in value applied to the record associated with the data transfer recipient.

The client device 110 is configured to receive input of various information. In particular, a user may input information relating to various operations that are desired to be managed using the client device 110. For example, one or more applications on the client device 110 may allow the user to indicate details about operations associated with the user and quantities of resources allocated to said operations. In some embodiments, the operations may be device operations that are desired to be performed on the client device 110. For example, the user may specify how much computing resources should be allocated to various software applications, and background services that are running on the client device 110. A job scheduler application (or application programming interface, API) may be used for selecting operations, allocating resources to the operations, and automating the operations on the client device 110. Accordingly, the client device 110 may receive input of, among others, job or task identifiers, scheduled time of execution of job, and quantities of computing resources (e.g. network bandwidth, processing power, memory, etc.) allocated to the jobs.

In some embodiments, the operations may be specific tasks or objectives associated with the user. In particular, the client device 110 may be used to manage personal activities and goals of a user (or other entity). For example, a personal financial management (PFM) application may be provided on the client device 110, providing the user with various functionalities relating to financial management. The PFM application may facilitate, for example, tracking personal expenses, cost splitting, scheduling debt payments, automated investments, and creating and monitoring personal budgets. Accordingly, the client device 110 may receive input of, among others, personal finance information, definitions of goals or budgets, and payee information.

The client device 110 and the resource server 160 may be in geographically disparate locations. Put differently, the client device 110 may be remote from the resource server 160. Both the client device 110 and the resource server 160 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
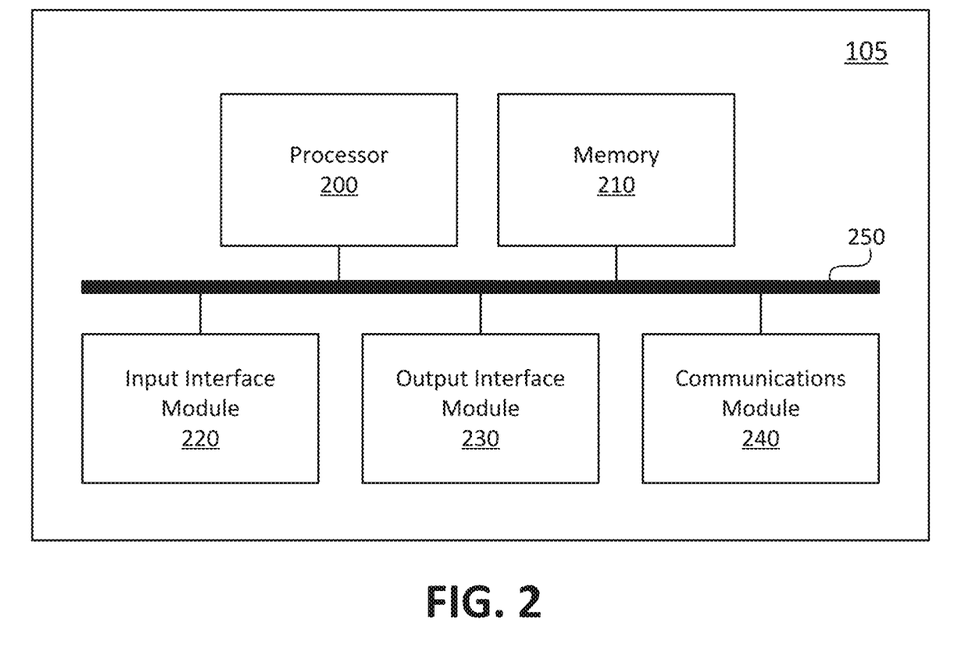
FIG. 2 is a high-level schematic diagram of an example computing device.

FIG. 2 is a high-level operation diagram of the example computing device 105. In some embodiments, the example computing device 105 may be exemplary of the client device 110 and/or the resource server 160. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. The output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communication signals. Communication signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Alternatively, instructions may be executed by the processor 200 directly from read-only memory of memory 210.

Figure 3:
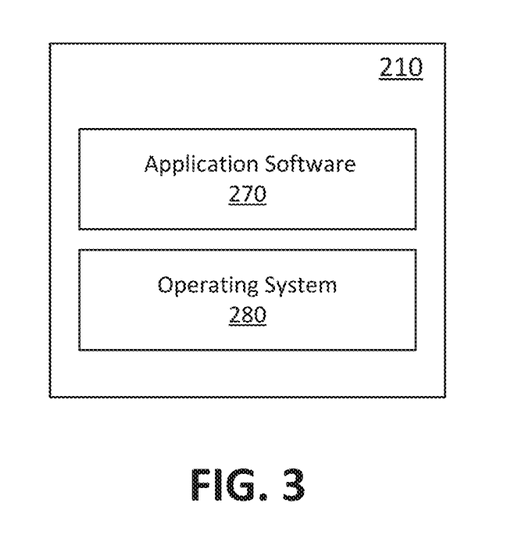
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing a particular function. The application software 270 may, for example, comprise a resource allocation application. A resource allocation application may be used to define operations, tasks, or objectives associated with the client device 110 or a user of the client device 110, and to allocate various quantities of resources to the defined operations/tasks/objectives. The resource allocation application may, for example, be a job scheduler application for managing device operations, such as tasks and background services, and allocating quantities of computing resources to the device operations. A job scheduler may be used to control which tasks (e.g. applications) and background services are actively running on the client device 110, and to manage, in real-time, the allocation of computing resources to those tasks and services. For example, the job scheduler may allow users to define parameters for controlling the quantities of computing resources that can be consumed by individual tasks and services.

Figure 7A:
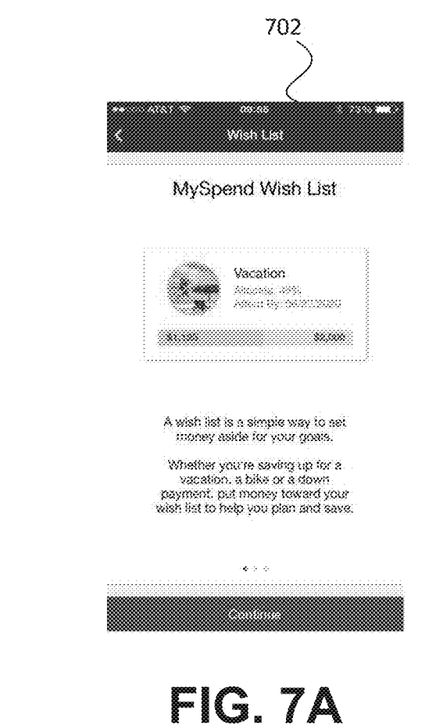
FIGS. 7A-7I show example screens of a graphical user interface for a resource allocation application.
Figure 7B:
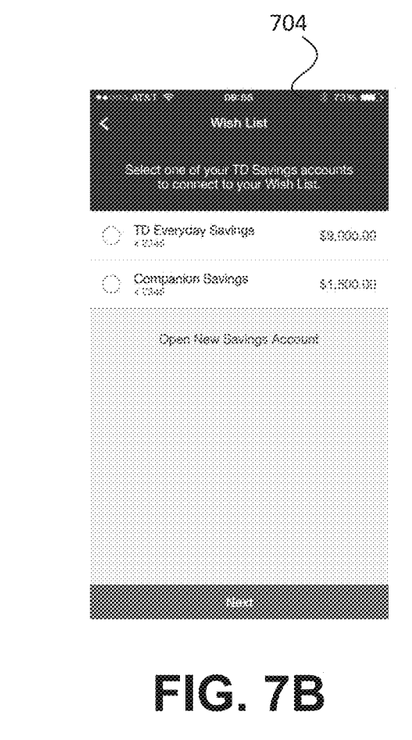
Figure 7C:
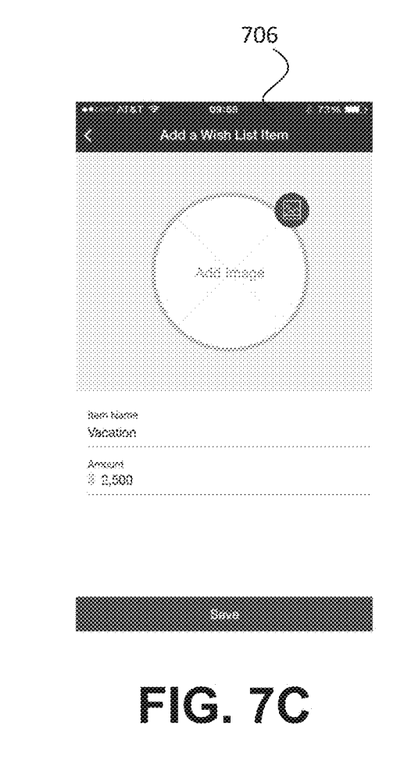
Figure 7D:
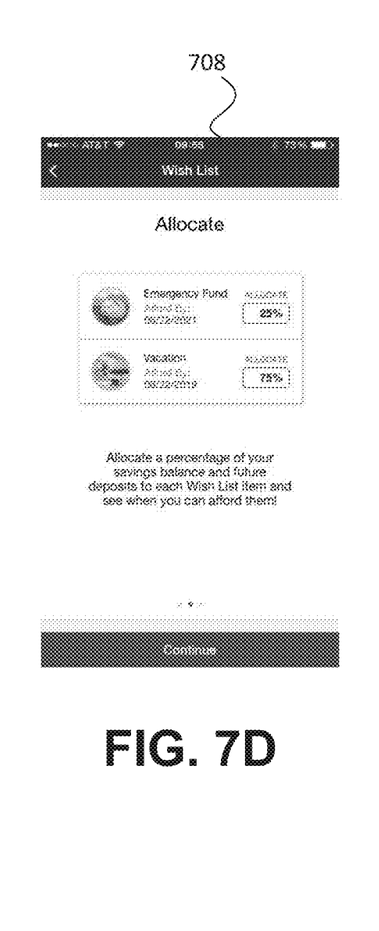
Figure 7E:
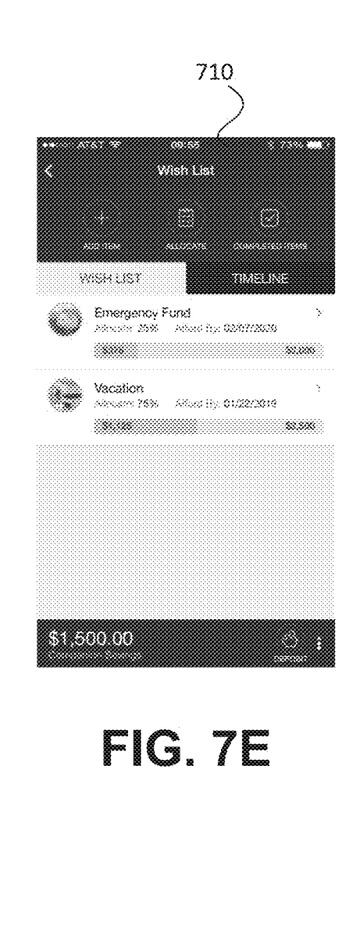
Figure 7F:
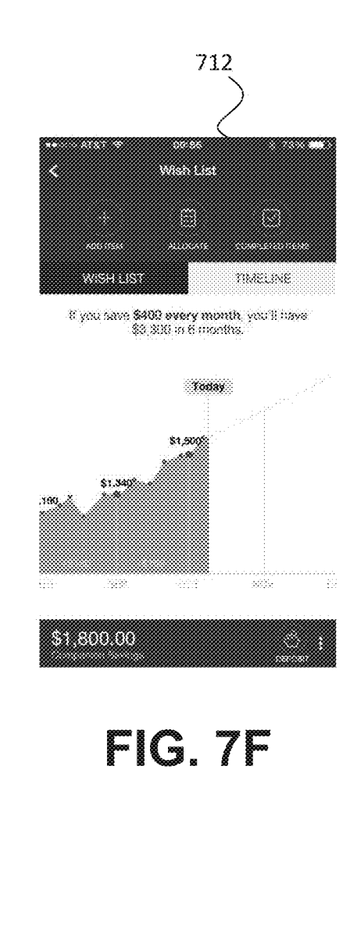
Figure 7G:
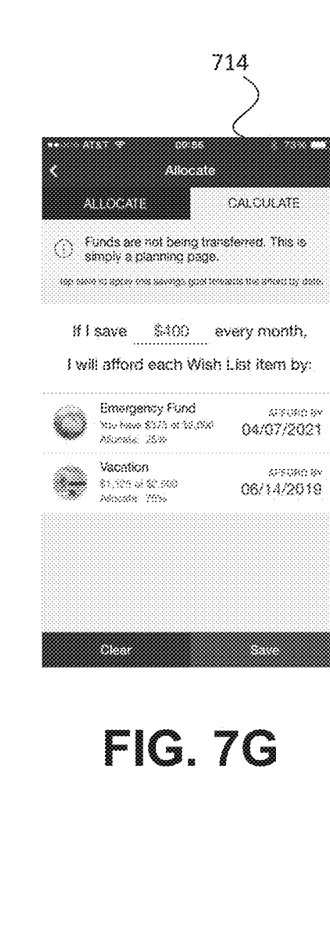

As another example, the resource allocation application may be a personal finance management (PFM) application. Reference is made to FIGS. 7A-7I, which show example screens of a graphical user interface (GUI) of a PFM application. A PFM application allows users to track expenses, balances, and savings, and facilitates personal budgeting. In particular, a PFM application may be used to define various savings goals and set aside (or allocate) money toward those goals. As shown in FIG. 7A, a PFM application may maintain a list ("Wish List" in screen 702) of savings goals defined by a user. The savings goals may be tied to a specific banking account. FIG. 7B shows screen 704, which allows a user to select one of the user's banking accounts to connect to their list of savings goals. The PFM application allocates funds of the selected banking account to the user-defined savings goals. For example, the savings balance and future deposits in a selected savings account may be allocated to the user's savings goals based on one or more allocation rules (e.g. percentages, ratios, etc.) defined by the user. FIG. 7D shows an example screen 708 which allows a user to define relative percentages for allocating savings balance/deposits to different savings goals. The PFM ensures that savings balance/deposits of the selected account are allocated according to the user-defined percentages.

A savings goal may be defined, via freeform text input or selection from a picklist of common or suggested goals. As shown in FIG. 7C, the GUI of a PFM application may enable a user to input various details about a savings goal ("Wish List Item" in screen 706). In some embodiments, a picklist of goals may be generated based on personal data associated with a user of the PFM application. For example, the picklist may contain only those goals which are determined to be relevant for the user based on the user's personal information (e.g. age, marital status, employment status, etc.) and/or historical transactions data (e.g. past purchases, ongoing payments, etc.). The savings goals of the picklist may be presented in an order, or priority, which may also be determined based on the user's personal data. For example, a goal to save for a down-payment may be listed or ordered in the picklist with a higher priority for a user of a particular age but may be de-prioritized or excluded altogether for a user of a different age (i.e. an age that is not considered to be a first-time homebuying age).

A PFM application may allow users to define threshold quantities of resources associated with the selected savings goals. A threshold quantity may, for example, be a quantity of resources that is required to complete a particular savings goal. By way of example, if a savings goal is associated with a specific activity (e.g. vacation), the threshold quantity specified by the user may be an expected cost of performing the activity. FIG. 7C shows an example screen 706 for creating a "Wish List item" in a PFM application. The screen 706 includes input fields for defining an item name for the Wish List item (i.e. an identifier of a savings goal) and a dollar amount associated with the Wish List item (e.g. cost associated with completing the savings goal).

The resource allocation application may be a stand-alone application, such as a mobile app, or integrated into another application or software module resident on the example computing device 105 as a sub-function or feature. In some embodiments, features of the resource allocation application may be integrated into a personal banking application. For example, the resource allocation application may be a component of software for managing personal accounts on servers of a bank institution.

The resource allocation application is associated with a backend application server. In at least some embodiments, a resource server (such as resource server 160 of FIG. 1) may also serve as the backend application server for the resource allocation application. In particular, various functions of the resource allocation application may be provided, at least in part, by a resource server. For example, a server associated with a financial institution may perform backend services of the resource allocation application. Thus, the resource server may be configured to access personal finance information for a client, receive financial goals data from the client, determine initial allocation of resources to one or more financial goals, and configure re-allocations of resources or generate offers to lend additional resources to the client.

Figure 4:
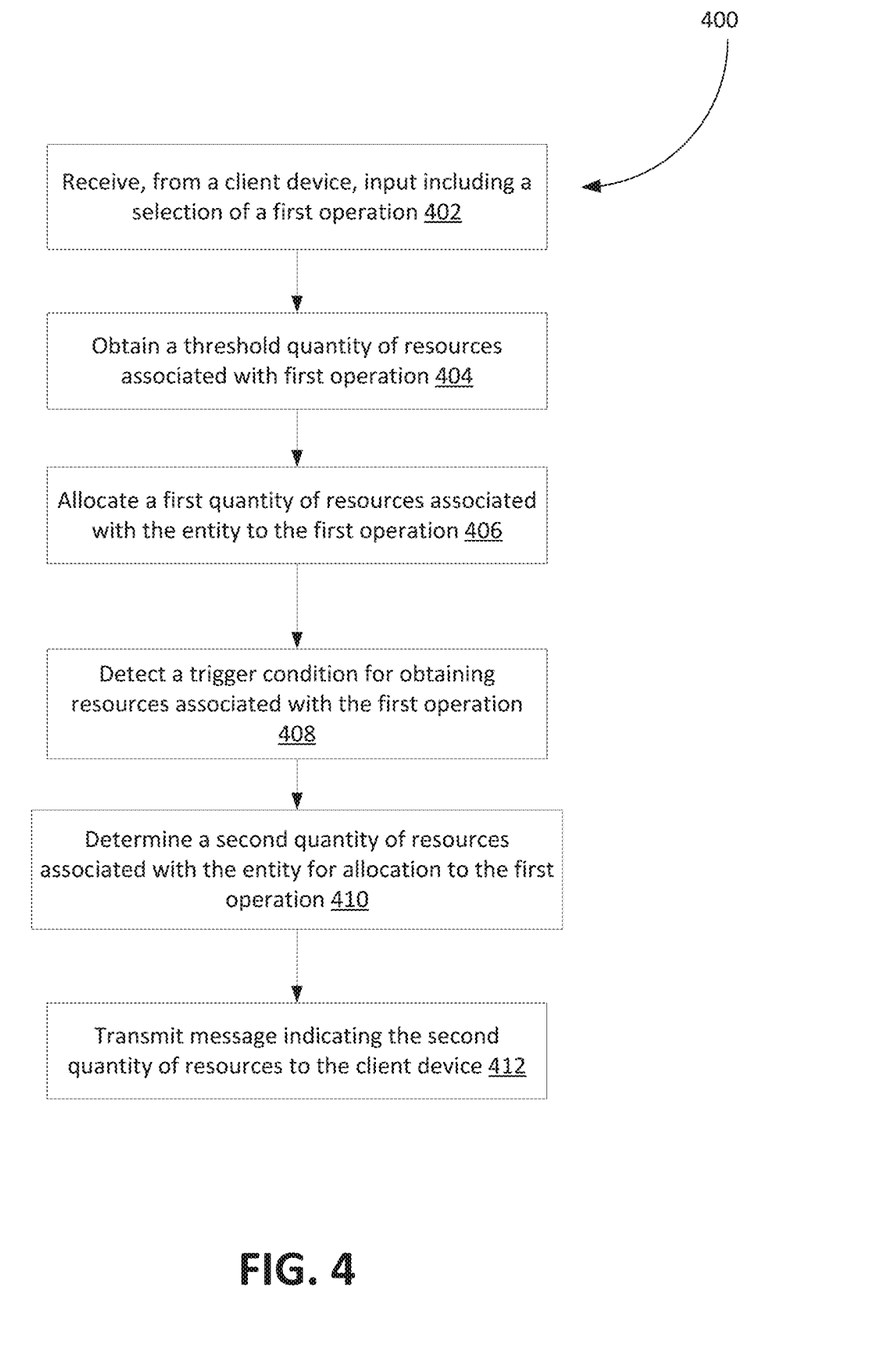
FIG. 4 shows, in flowchart form, an example method for allocating resources to an operation associated with a client device.

Reference is made to FIG. 4, which shows, in flowchart form, an example method 400 for allocating resources to a plurality of operations associated with a client device. Specifically, the method 400 allows for allocating resources associated with an entity to one or more operations selected by the entity. Steps 402 and onward are performed by one or more processors of computing devices such as, for example, the processor 200 (FIG. 2) of one or more suitably configured instances of the example computing device 105 (FIG. 2).

In at least some embodiments, the method 400 may be performed by a server, such as resource server 160 of FIG. 1, that is communicably connected to a client device. The server may be a resource server configured for allocating resources to various operations. For example, the server may determine allocations of computing resources to various device operations of the client device. The server may provide computing resources to the client device in quantities as determined by the resource allocations. As another example, the server may be a resource management server which manages one or more resource accounts of the entity associated with the client device. For example, the server may have access to one or more database records corresponding to the entity's resource accounts. The server may allocate resources from the entity's resource accounts to operations or objectives that are selected by the entity using the client device.

In step 402, the server receives, from a client device, user input including selection of a first operation. The input may be received via a resource allocation application that is resident on the client device. For example, a resource allocation application may prompt a user to define an operation or select an operation from a picklist containing a plurality of common operations. In some embodiments, the first operation may be a device operation associated with the client device. The selected device operation may, for example, be a task, background service, etc. that can be run on the client device. Alternatively, the first operation may be a savings goal for the user. In particular, user selection of a savings goal may be received at the server, via a PFM application resident on the client device, in step 402. The savings goal may be defined as, for example, an activity (e.g. "Vacation", as shown in screen 706 of FIG. 7C), an event (e.g. "Wedding"), or a savings objective (e.g. "save $200 per month").

The user input may include additional information relating to the first operation. In some embodiments, the user input may include a date parameter associated with the first operation. For example, the date parameter may indicate a date by which the first operation is desired to be performed or completed. The date parameter may be specified as a particular date, or a period of time that begins at the time of receipt of the user input.

In some embodiments, the user input may include at least one location associated with the first operation. The at least one location may be a location where the first operation may be performed or completed. For example, if the first operation is a background task for an application on the client device that is to be performed at specific predetermined geographical locations, the at least one location may indicate such locations. As another example, if the first operation is a purchase activity for purchasing a particular product, the at least one location may indicate the locations of one or more commercial establishments where such purchases can be made.

In step 404, the server obtains a threshold quantity of resources associated with the first operation. The threshold quantity may, for example, represent a quantity of resources that is required to perform or complete the first operation. In at least some embodiments, the threshold quantity is obtained from the client device. For example, a threshold quantity associated with the first operation may be input by the user on the client device. That is, in addition to selection of the first operation, a user may also provide threshold quantity information associated with the first operation. In the context of a PFM application, a user may define a savings goal as well as a savings amount associated with the savings goals. As shown in screen 706 of FIG. 7C, the GUI of a PFM application may provide input fields for, at least, an identifier (e.g. item name) of a savings goal and an associated dollar amount (i.e. threshold quantity) associated with the savings goal.

In some embodiments, the client device may itself provide threshold quantity information to the server. In particular, the client device may determine a threshold quantity associated with the first operation, without user input. For example, if the first operation is a device operation, the client device may retrieve information relating to computing resource requirements of the first operation and transmit this information to the server.

Additionally or alternatively, the server may obtain the threshold quantity associated with the first operation from a remote data source. In particular, the server may be configured to retrieve the threshold quantity information from a remote source, such as a third-party website or database. In some embodiments, the server may query a remote source using details of the first operation and determine a threshold quantity associated with the first operation based on results of the query. For example, if the first operation is a savings goal, the server may retrieve, from one or more online retailers or marketplaces, a dollar amount associated with the savings goal. The savings goal may, for example, be defined by a product (e.g. vacation, bike, etc.) that a user desires to save money toward, and the server may retrieve a price associated with the product from various online retailers or marketplaces.

In step 406, the server allocates a first quantity of resources associated with the entity to the first operation. In at least some embodiments, the server may allocate a first quantity of resources of a user account associated with the entity. For example, the server may allocate funds of a selected savings account to the first operation. The allocation may, in some embodiments, be based on user input. For example, a user of the client device may indicate, via manual input, a first quantity of resources to allocate to the first operation. The first quantity may be specified as a percentage (e.g. percentage of funds in the selected account) or as an absolute dollar amount. The input indicating the first quantity of resources may, in some embodiments, be received with the initial user input selecting the first operation, in step 402.

Alternatively, the allocation of the first quantity of resources may be completed by the server automatically. In particular, the server may determine the first quantity of resources to allocate to the first operation based on one or more pre-defined allocation parameters for allocating resources of an account associated with the entity. In some embodiments, the allocation parameters may be defined via a resource allocation application on the client device. The user may, for example, save one or more allocation parameters on the resource allocation application and indicate that resources of a selected account be allocated to operations (or objectives) of the entity according to the allocation parameters.

In some embodiments, allocation parameters may be expressed as percentages. That is, an allocation parameter may specify a percentage of resources of a selected account that is to be allocated to a particular operation/objective. By way of example, if a user of the client device has defined three different objectives, the user may indicate that 25% of all resources of the selected account are to be allocated toward the first objective, 25% toward the second objective, and 50% toward the third objective. In some embodiments, allocation parameters may include one or more time-based rules. For example, the allocation parameters may be defined to vary over time. A user may, for example, configure the allocation parameters to allocate a greater amount of resources to a recurring task or event that is imminent, and to decrease the allocation rate to the task or event when the task or event has completed for the year.

The allocation parameters may, in some cases, be based on the defined threshold quantities for various operations or objectives. For example, the allocation parameters may be set such that, when a threshold quantity associated with an objective is reached, no further resources will be allocated toward that objective. Alternatively, the allocation parameters may be set such that, when a threshold quantity associated with an objective is reached, the relative amount that is allocated to that goal may decrease. For example, before the threshold quantity is reached for an operation, the user's resources may be allocated 10% toward the operation, whereas after the threshold is reached, the allocation rate may decrease to 5%.

Once the allocation parameters are defined by the user, the resource allocation application may be configured to allocate unallocated resources of the selected account based on the defined allocation parameters. In particular, the resource allocation application may monitor for excess resources. Excess resources may be detected, for example, when a resource usage level for a defined period falls below a threshold. For example, when a monthly resource usage for a given month drops below a threshold representing a historic average, the resource allocation application may determine an amount of excess resources as the difference between the monthly spend for that month and a threshold representing the historic average.

In step 408, the server detects a trigger condition for obtaining resources associated with the first operation. In particular, a trigger condition that suggests that the first operation can be performed or completed imminently is detected by the server. Various different trigger conditions may be defined by the entity, and provided to the server via user input on the client device. Additionally or alternatively, the trigger conditions may be automatically determined by the server based on one or more pre-defined policies.

In some embodiments, the trigger condition may include a date condition. For example, when the first operation is selected by the entity in step 402, an associated date may also be selected and provided as part of the user input. The date may be a date when the entity desires to complete the first operation. For example, when a user is saving resources for a particular event, the date may be selected to be date of the event. The server may detect the trigger date condition by determining that a current date (i.e. the date of detection) is within a time range defined based on the date parameter which may be associated with the first operation. For example, if a date condition indicates that an objective is to be completed by a first date, the trigger date condition may be detected a certain period of time (e.g. month) prior to the first date.

In some embodiments, the trigger condition may be detected based on a resource borrowing capacity for the entity. The server may store or have access to a pool of resources which may be shared or lent to the entity. In some embodiments, based on profile data associated with the entity's accounts at the server, the server may determine a quantity of resources that is available for borrowing by the entity. That is, a resource borrowing capacity is determined for the entity. For example, the server may determine a maximum resource (e.g. computing resources, unsecured credit, etc.) lending amount that is available for the entity.

If the server detects that a quantity of resources that is available for borrowing is greater than a difference between the threshold quantity of resources associated with the first operation and the previously allocated first quantity of resources, the server detects a trigger condition for obtaining additional resources to allocate to the first operation. That is, when the entity is close enough to the threshold quantity for the first operation such that the entity could borrow a sufficient amount of resources to perform or complete the operation, the trigger condition may be detected.

In some embodiments, a trigger condition may be detected based on transactions data for the entity. In particular, the server may detect a trigger condition upon determining, based on transaction data for the entity, that at least a threshold number of transactions associated with the first operation have been completed. For example, recent purchase activities for the entity may be analyzed by the server to detect when the entity is preparing to complete a certain operation. By way of example, a transaction in which the entity purchased ski equipment may suggest that the entity is preparing to take a ski trip that they have been saving for. A transaction in which the entity purchased a bathing suit may suggest that the entity is preparing to take a vacation. When the server detects transactions or occurrence of predetermined events suggesting imminence of the first operation, the server may detect a trigger condition.

In some embodiments, a trigger condition may be detected based on location data associated with the first operation. As explained above, the user input received from the client device in step 402 may specify at least one location associated with the first operation. The server may receive, from the client device, geolocation data for the client device. For example, the client device may be configured to periodically transmit its location to the server, or the server may query the client device for its location at regular intervals. The server may detect a trigger condition upon determining, based on location data for the client device, that the client device is located at or in a vicinity of the at least one location associated with the first operation. That is, the current location of the client device may be monitored and a trigger condition detected when the client device is in close proximity of the at least one location associated with the first operation. For example, when the entity is saving for a particular product (e.g. bike), and the client device is determined to be located at a commercial establishment that is known to sell the product (e.g. a bike store), a trigger condition may be detected by the server. As another example, when the client device is at a certain pre-defined location, a task or background service (i.e. first operation) associated with the client device may be initiated. The server, upon detecting that the client device is at the pre-defined location, may detect a trigger condition for obtaining additional resources to allocate to the task/background service.

In some embodiments, a trigger condition may be detected when the server detects that the threshold quantity of resources associated with the first operation has changed and the change meets certain defined criteria. For example, if the quantity of resources required to perform the first operation falls below a certain pre-defined threshold, the server may detect a trigger condition. For an entity that is saving toward purchase of a particular product, the change in threshold quantity may comprise a sale (i.e. reduction in price) of the product. If the server determines, based on price information obtained from online retailers or marketplaces, that the price of the product has fallen below a certain price level, a trigger condition may be detected. As another example, the server may determine that a quantity of computing resources required to perform a particular device operation has been reduced (e.g. due to completion of other device operations sharing a common pool of computing resources) below a defined threshold, and the server may detect a trigger condition for the device operation.

In response to detecting a trigger condition for obtaining resources associated with the first operation, the server determines a second quantity of resources associated with the entity for allocation to the first operation, in step 410. The second quantity of resources is determined based on a difference between the threshold quantity of resources associated with the first operation and the previously allocated first quantity of resources. In at least some embodiments, the server determines, in step 410, an increase in quantity of resources associated with the entity for allocation to the first operation. In particular, the server determines how much more resources is required for performing or completing the first operation.

In step 412, the server transmits a signal representing a message indicating the second quantity of resources to the client device. For example, the server may send a message which indicates the difference between the threshold quantity of resources associated with the first operation and the total quantity of resources previously allocated to the first operation.

Figure 5:
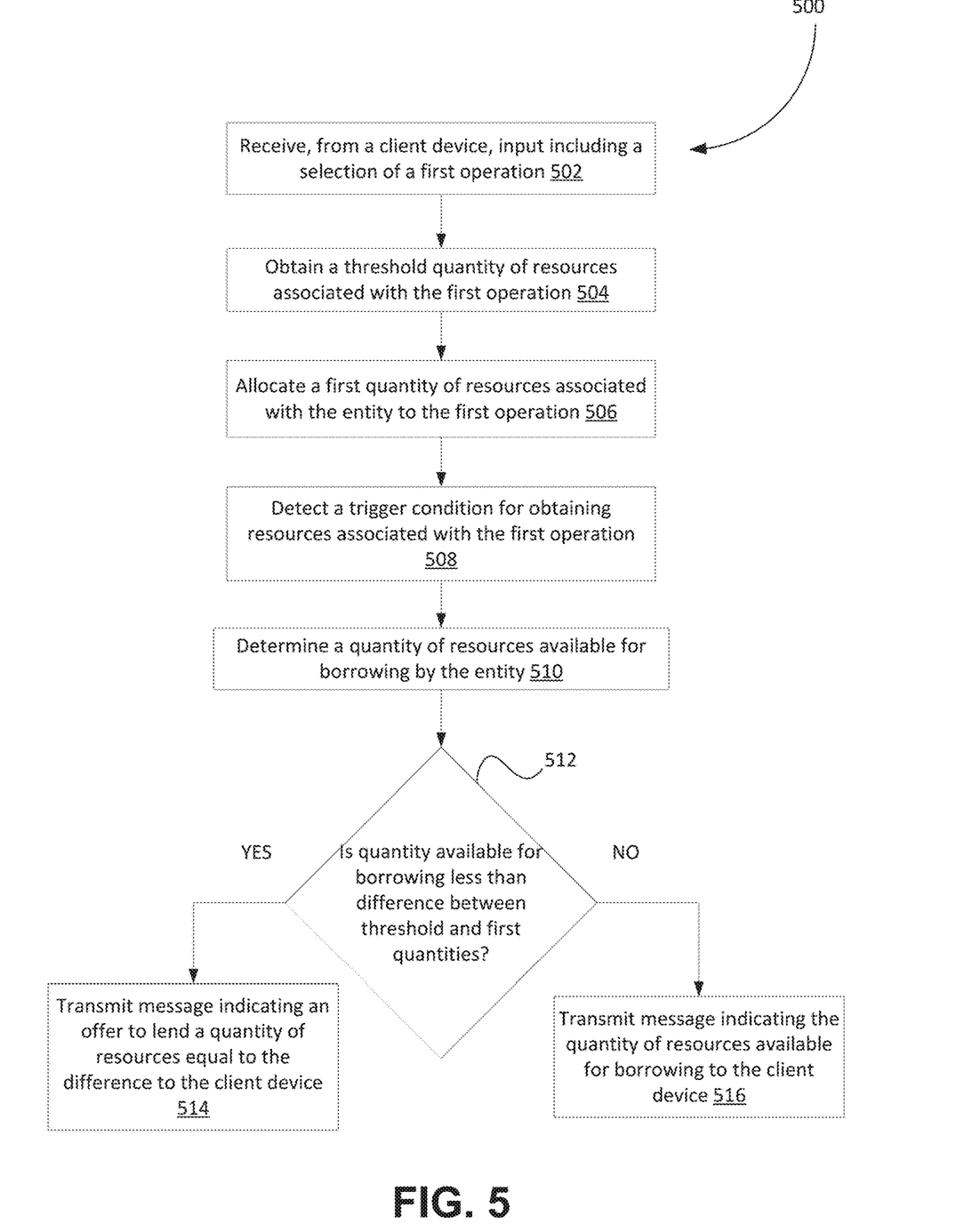
FIG. 5 shows, in flowchart form, another example method for allocating resources to an operation associated with a client device.

In at least some embodiments, the second quantity of resources represents a quantity of resources that is available for borrowing by the entity for allocation to the first operation. Based on this second quantity of resources, the server may be configured to generate an offer to increase a quantity of resources that is allocated to the first operation. FIG. 5 shows, in flowchart form, a variant example method 500 for allocating resources to an operation associated with a client device. Steps 502 and onward are performed by one or more processors of computing devices such as, for example, the processor 200 (FIG. 2) of one or more suitably configured instances of the example computing device 105 (FIG. 2). As with method 400, the method 500 may be implemented by a server, such as resource server 160 of FIG. 1, that is communicably connected to a client device. The server may be a resource server configured for allocating resources to various operations. For example, the server may determine allocations of computing resources to various device operations of a client device.

Steps 502, 504, 506 and 508 correspond to steps 402, 404, 406 and 408 of method 400, and may be performed according to the description of those steps provided above. In step 510, the server determines a quantity of resources that is available for borrowing by the entity. For example, the server may determine a quantity of resources that is stored by, or accessible to, the server, and which is determined to be available for borrowing by the entity. This determination of available borrowing capacity may be made based on various factors, such as historical resource usage by the entity and priority of the entity and its operations. The server may, for example, be a server associated with a bank institution, and may determine borrowing capacity for the entity based on, at least, the entity's credit history and banking products and/or services purchased by the entity.

In step 512, the server determines whether the quantity available for borrowing by the entity is less than a difference between the threshold quantity of resources associated with the first operation and previously allocated first quantity of resources. That is, the server determines that the quantity of resources available for borrowing is sufficient to bridge the gap needed to complete the first operation. If the available borrowing capacity is less than the difference, the server may transmit, to the client device, a message indicating an offer to lend a quantity of resources to the entity, in step 514. For example, the message may indicate a quantity of resources equal to the difference between the threshold quantity associated with the first operation and the previously allocated first quantity of resources.

Figure 7H:
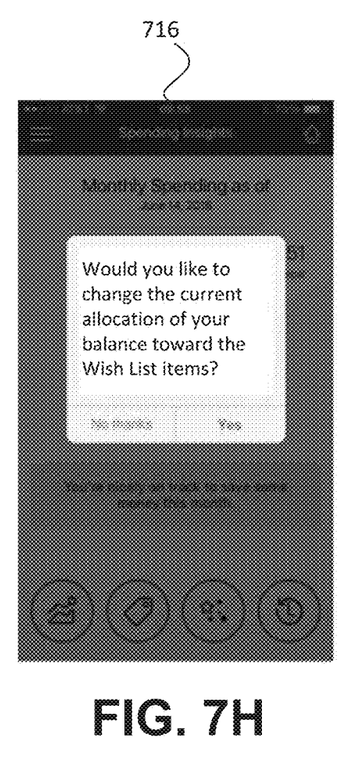
Figure 7I:
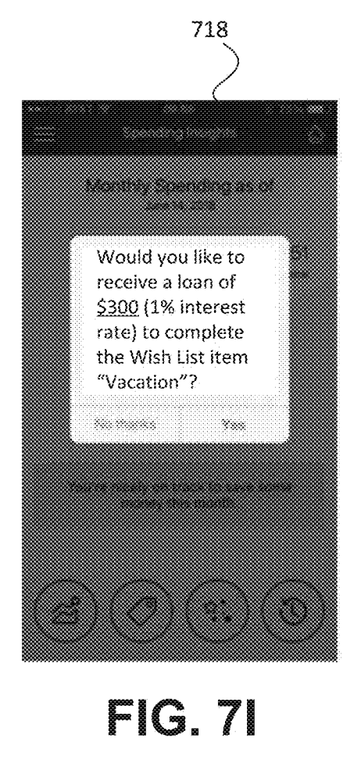

If, on the other hand, the available quantity of resources for borrowing is equal to or greater than the difference (i.e. quantity required to perform or complete the first operation), the server may transmit a message indicating the quantity of resources that is available for borrowing to the client device, in step 516. In some embodiments, the server may instruct the client device to generate a prompt for providing an offer to increase a quantity of resources that is allocated to the first operation. FIG. 7I shows an example screen 718 which may be displayed to a user by a PFM application. Specifically, an offer of a loan from a resource server is provided on the GUI of the PFM application, with selectable user interfaces for either accepting the offer or rejecting the offer. In some embodiments, acceptance of the offer by selection of the corresponding user interface may display a further screen providing details of the loan offer.

Figure 6:
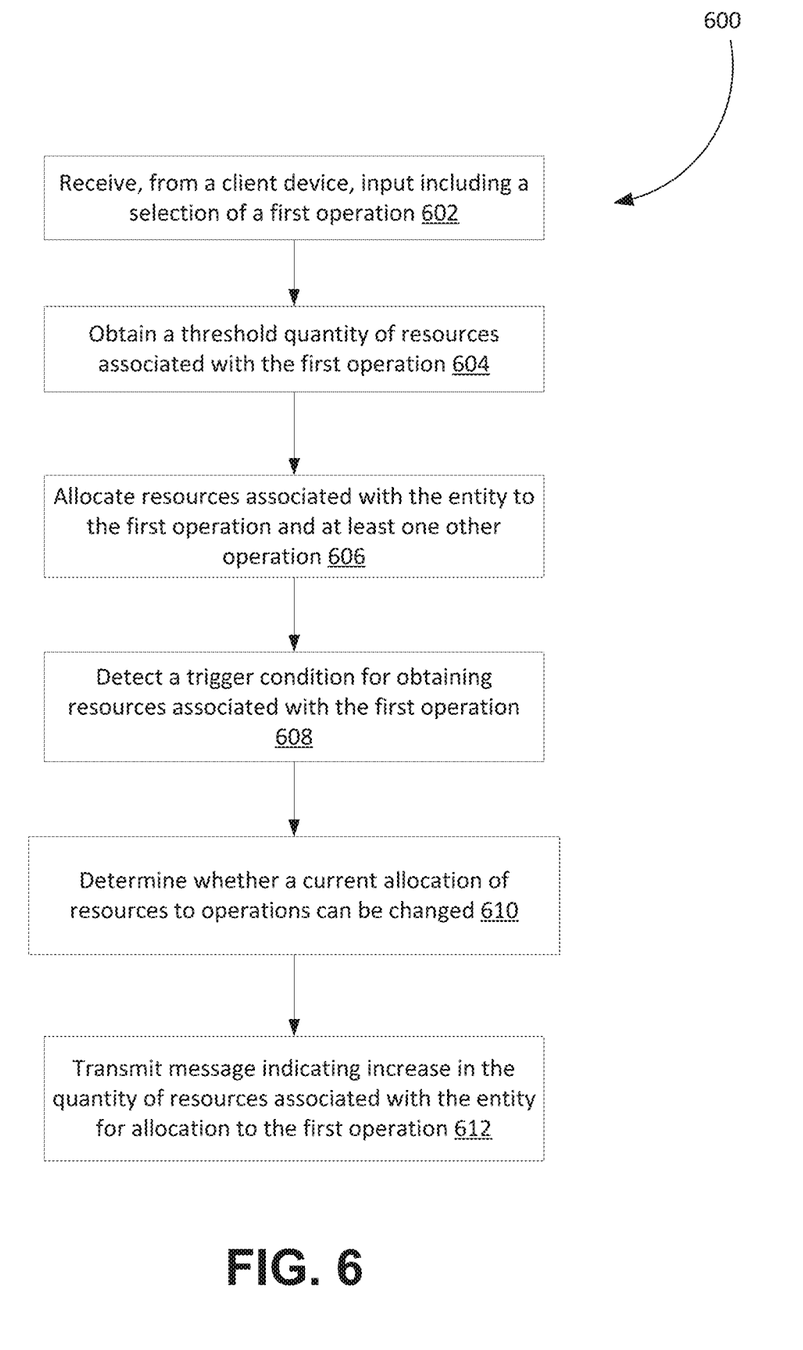
FIG. 6 shows, in flowchart form, another example method for allocating resources to an operation associated with a client device.

Reference is now made to FIG. 6, which shows, in flowchart form, another example method 600, for allocating resources to an operation associated with a client device. Steps 602 and onward are performed by one or more processors of computing devices such as, for example, the processor 200 (FIG. 2) of one or more suitably configured instances of the example computing device 105 (FIG. 2). As with methods 400 and 500, the method 600 may be implemented by a server, such as resource server 160 of FIG. 1, that is communicably connected to a client device.

The method 600 allows a server to manage allocations of resources among multiple different operations. Specifically, the server may implement all or parts of method 600 in allocating and re-allocating resources among a plurality of operations, based on detection of triggers associated with one or more of the operations.

Steps 602 and 604 may be performed according to the description of steps 402-404 and steps 502-504 provided above. In step 606, the server allocates resources associated with a user to a first operation and to at least one other operation. For example, a user may input, on the client device, selections of multiple different operations, and the selections may then be transmitted to the server. The user input on the client device may include additional information such as, for example, threshold quantities of resources, projected completion dates, and locations associated with the respective operations selected by the user.

In step 608, the server detects a trigger condition for obtaining resources associated with the first operation. The trigger condition may be any one of the trigger conditions described above in relation to step 408 of method 400. Upon detecting the trigger condition, the server determines whether a current allocation of resources associated with the entity can be changed, in operation 610. In particular, the server determines whether resources of a selected user account may be re-allocated. In some embodiments, the server may determine how to rearrange allocations of resources to at least one operation different from the first operation to free up resources for allocating to the first operation. For example, a re-allocation of resources may comprise an increase in allocation to the first operation and a decrease in allocation to one or more of the other operations. Since the detected trigger condition is associated with the first operation, the server determines that the first operation can be performed or completed imminently. As a consequence, the server may prioritize allocating resources to the first operation over other operations, facilitating completion of the first operation. The total pool of available resources for the entity being limited, the re-allocation of resources to the operations allows the server to channel resources among the operations for a more optimal allocation, or at least an allocation that is conducive to completion of the first operation.

The selection of the other operations for which resource allocations may be reduced may be based upon priority or importance of the other operations. For example, the re-allocation of resources by the server may increase allocation to the first operation by reducing allocations to the least prioritized operations. Thus, the server may re-allocate resources based on a ranking or priority list of the operations associated with the entity. In some embodiments, the priority of the operations may be determined based on the dates associated with the operations. For example, an operation that has an earlier associated date may be prioritized relative to other operations that have later dates.

In some embodiments, the server may determine whether there are excess resources in the selected user account that have not been allocated to any operation. In a PFM application, any savings balance that has not been allocated to other operations (i.e. savings goals) may be available for allocating to the first operation. In some embodiments, the server may also check whether the user has other accounts from which resources may be freed up for increasing allocation to the first operation. For example, the server may check the user's other savings accounts, if any, and determine if there are available funds in those accounts to allocate to the first operation.

Upon determining whether a change in current allocation of resources of the selected user account is available, the server may instruct the client device to provide options for re-allocating the resources. That is, various options for changing the current allocation of resources of the user account may be presented to the user, via the client device. For example, the client device may provide a prompt for the user to confirm whether to change a current allocation of resources. Screen 716 of FIG. 7H illustrates such prompt, which may be displayed by a PFM application. If the user indicates that a re-allocation is desired, the PFM application may present further screens displaying options for changing the current allocation of resources. The options may, for example, include: allocating excess funds from the user's other accounts to the first operation; decreasing allocation to one or more operations other than the first operation to increase allocation for the first operation; and transferring additional funds to the selected user account (for example, transferring more funds from a chequing account to the user's savings account that is associated with the first operation/savings goal).

In step 612, the server transmits a message to the client device indicating the increase in allocation to the first operation. For example, the message may identify the resource quantity increase allocated for the first operation, identities of the other operations for which allocated resources are reduced, and the quantities of resources that are reduced for those other operations. In some embodiments, the server may instruct the client device to prompt the user of the client device to provide confirmation or approval of the re-allocation determined by the server. For example, a PFM application may present the user with a prompt to confirm the re-allocation of resources. If the user provides confirmation of the re-allocation, the server may carry out the indicated change to the current allocation of resources of the selected user account. In particular, an allocation of resources to the first operation may be increased.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A system, comprising:
a processor;
a communications module coupled to the processor; and
a memory coupled to the processor, the memory storing instructions that, when executed, configure the processor to:
receive, via the communications module from a client device associated with an entity, input including a selection of a first operation comprising a device operation of the client device;
determine a threshold quantity of resources associated with performing the first operation;
allocate a first quantity of resources associated with one or more database records of the entity to the first operation;
detect a trigger condition associated with the first operation for generating offers for lending resources to the entity in connection with the first operation, the trigger condition including at least one of a projected completion time, a resource cost, or a location associated with the first operation;
determine, based on profile data associated with the entity, a resource borrowing capacity of the entity; and
in response to detecting the trigger condition:
determine a second quantity of resources associated with the entity for allocation to the first operation based on (1) a difference between the threshold quantity of resources associated with the first operation and a total quantity of resources associated with the one or more database records of the entity previously allocated to the first operation, and (2) the resource borrowing capacity of the entity; and
transmit, to the client device, a message representing an offer for lending the second quantity of resources.

2. The system of claim 1, wherein determining the second quantity of resources comprises determining an increase in quantity of resources associated with the entity for allocation to the first operation.

3. The system of claim 2, wherein determining the increase in quantity of resources associated with the entity for allocation to the first operation comprises determining a quantity of resources available for borrowing by the entity, and wherein the instructions, when executed, further configure the processor to transmit, to the client device, a second message indicating the quantity of resources available for borrowing.

4. The system of claim 3, wherein detecting the trigger condition comprises determining that the quantity of resources available for borrowing is greater than a difference between the threshold quantity of resources associated with the first operation and the total quantity.

5. The system of claim 2, wherein the entity is associated with at least one other operation different from the first operation, and wherein determining the increase in quantity of resources associated with the entity for allocation to the first operation comprises determining a change in allocation of resources associated with the entity to one or more of the at least one other operation.

6. The system of claim 1, wherein the input includes a date parameter associated with the first operation, and wherein detecting the trigger condition comprises determining that a current date is within a time range defined based on the date parameter associated with the first operation.

7. The system of claim 1, wherein detecting the trigger condition comprises determining, based on transactions data for the entity, that at least a threshold number of transactions associated with the first operation have been completed.

8. The system of claim 1, wherein the input includes at least one location associated with the first operation, and wherein detecting the trigger condition comprises detecting, based on location data for the client device, that the client device is located at one of the at least one location.

9. The system of claim 1, wherein detecting the trigger condition comprises detecting that the threshold quantity of resources associated with the first operation has changed.

10. A computer-implemented method, comprising:
receiving, from a client device associated with an entity, input including a selection of a first operation comprising a device operation of the client device;
determining a threshold quantity of resources associated with performing the first operation;
allocating a first quantity of resources associated with one or more database records of the entity to the first operation;
detecting a trigger condition associated with the first operation for generating offers for lending resources to the entity in connection with the first operation, the trigger condition including at least one of a projected completion time, a resource cost, or a location associated with the first operation;
determining, based on profile data associated with the entity, a resource borrowing capacity of the entity; and
in response to detecting the trigger condition:
determining a second quantity of resources associated with the entity for allocation to the first operation based on (1) a difference between the threshold quantity of resources associated with the first operation and a total quantity of resources associated with the one or more database records of the entity previously allocated to the first operation, and (2) the resource borrowing capacity of the entity; and
transmitting, to the client device, a message representing an offer for lending the second quantity of resources.

11. The method of claim 10, wherein determining the second quantity of resources comprises determining an increase in quantity of resources associated with the entity for allocation to the first operation.

12. The method of claim 11, wherein determining the increase in quantity of resources associated with the entity for allocation to the first operation comprises determining a quantity of resources available for borrowing by the entity, and wherein the method further comprises transmitting, to the client device, a second message indicating the quantity of resources available for borrowing.

13. The method of claim 12, wherein detecting the trigger condition comprises determining that the quantity of resources available for borrowing is greater than a difference between the threshold quantity of resources associated with the first operation and the total quantity.

14. The method of claim 11, wherein the entity is associated with at least one other operation different from the first operation, and wherein determining the increase in quantity of resources associated with the entity for allocation to the first operation comprises determining a change in allocation of resources associated with the entity to one or more of the at least one other operation.

15. The method of claim 10, wherein the input includes a date parameter associated with the first operation, and wherein detecting the trigger condition comprises determining that a current date is within a time range defined based on the date parameter associated with the first operation.

16. The method of claim 10, wherein detecting the trigger condition comprises determining, based on transactions data for the entity, that at least a threshold number of transactions associated with the first operation have been completed.

17. The method of claim 10, wherein the input includes at least one location associated with the first operation, and wherein detecting the trigger condition comprises detecting, based on location data for the client device, that the client device is located at one of the at least one location.

18. The method of claim 10, wherein detecting the trigger condition comprises detecting that the threshold quantity of resources associated with the first operation has changed.

\* \* \* \* \*